(12) United States Patent
Chen et al.

(10) Patent No.: US 8,687,567 B2
(45) Date of Patent: Apr. 1, 2014

(54) UTILIZATION OF MULTIPLE ACCESS POINTS TO SUPPORT MULTIPLE APPLICATIONS AND SERVICES

(75) Inventors: Xuming Chen, San Ramon, CA (US); Imtiyaz Shaikh, Pleasant Hill, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 887 days.

(21) Appl. No.: 12/344,837

(22) Filed: Dec. 29, 2008

(65) Prior Publication Data

US 2010/0165928 A1    Jul. 1, 2010

(51) Int. Cl.
*H04W 4/00* (2009.01)

(52) U.S. Cl.
USPC ............ 370/329; 370/338; 370/331; 370/328

(58) Field of Classification Search
USPC .......... 370/329, 338, 331, 328; 455/436, 438, 455/450, 432.1
See application file for complete search history.

(56) References Cited

U.S. PATENT DOCUMENTS

| | | | |
|---|---|---|---|
| 6,091,962 A * | 7/2000 | Bonta | 455/502 |
| 6,144,855 A * | 11/2000 | Slovin | 455/432.1 |
| 6,147,986 A * | 11/2000 | Orsic | 370/349 |
| 6,917,808 B1 * | 7/2005 | Nelson | 455/436 |
| 2003/0211848 A1 * | 11/2003 | Rajkotia et al. | 455/436 |
| 2004/0156372 A1 * | 8/2004 | Hussa | 370/401 |
| 2005/0096051 A1 * | 5/2005 | Lee et al. | 455/438 |
| 2005/0237962 A1 * | 10/2005 | Upp et al. | 370/313 |
| 2006/0104245 A1 * | 5/2006 | Narayanaswami et al. | 370/332 |
| 2006/0199586 A1 * | 9/2006 | Yoon | 455/437 |
| 2006/0291448 A1 * | 12/2006 | Hellgren et al. | 370/352 |
| 2008/0009283 A1 * | 1/2008 | Lim et al. | 455/432.3 |
| 2008/0062871 A1 * | 3/2008 | Grayson | 370/231 |
| 2008/0146235 A1 * | 6/2008 | Kang et al. | 455/437 |
| 2009/0080381 A1 * | 3/2009 | Yashar et al. | 370/331 |

FOREIGN PATENT DOCUMENTS

| | | |
|---|---|---|
| CN | 101044714 | 9/2007 |
| CN | 101199231 | 6/2008 |

* cited by examiner

*Primary Examiner* — Rasheed Gidado

(57) ABSTRACT

A method that includes establishing a connection with a default access point, transmitting a request to access or utilize an application, a service, or a resource, receiving a response to the request that includes a location of a serving access point that provides the application, the service, or the resource, establishing a connection with the serving access point, and receiving an assignment of a network address that is anchored by the serving access point.

19 Claims, 8 Drawing Sheets

UTILIZATION OF MULTIPLE ACCESS POINTS TO SUPPORT MULTIPLE APPLICATIONS AND SERVICES

BACKGROUND

In a mobile environment, such as, for example, a mobile Internet Protocol (IP) network or some other type of wireless network, there exists a concept of a home agent. The home agent (sometimes referred to as an anchor point) may be a device in a home network that provides a constant presence for a mobile client device. For example, the home agent may have a static IP address. The home agent may process all traffic to and from the mobile client. In such a framework, the mobile client may have access to multiple applications and/or services via the home agent.

DETAILED DESCRIPTION OF PREFERRED EMBODIMENTS

The following detailed description refers to the accompanying drawings. The same reference numbers in different drawings may identify the same or similar elements.

The term "component," as used herein, is intended to be broadly interpreted to include hardware, or a combination of hardware and software.

The term "device," as used herein, is intended to be broadly interpreted to include an apparatus that includes one or more components.

The concepts described herein relate to providing a user device, such as, for example, a mobile station, with multiple anchor points (APs). Each AP may provide a particular level of access, control, billing mediation, etc., associated with one or more applications and/or services. In this regard, each AP may support different requirements and operate more efficiently in relation to an application and/or a service that the mobile station requires compared to existing schemes where, for example, one AP handles all applications and/or services that the mobile station requires. In this framework, a communication system may include multiple APs. Conversely, the mobile station may support multiple APs. The segmentation of APs may be based on a classification of an application, a service, a resource, etc. For example, the segmentation may be based on billed services, unbilled services (e.g., free services), special services (e.g., virtual private network (VPN)), applications that require separation of signaling and content, and/or other forms of segmentation that may relate to the application, service, resource, etc., provided.

Figure 1:
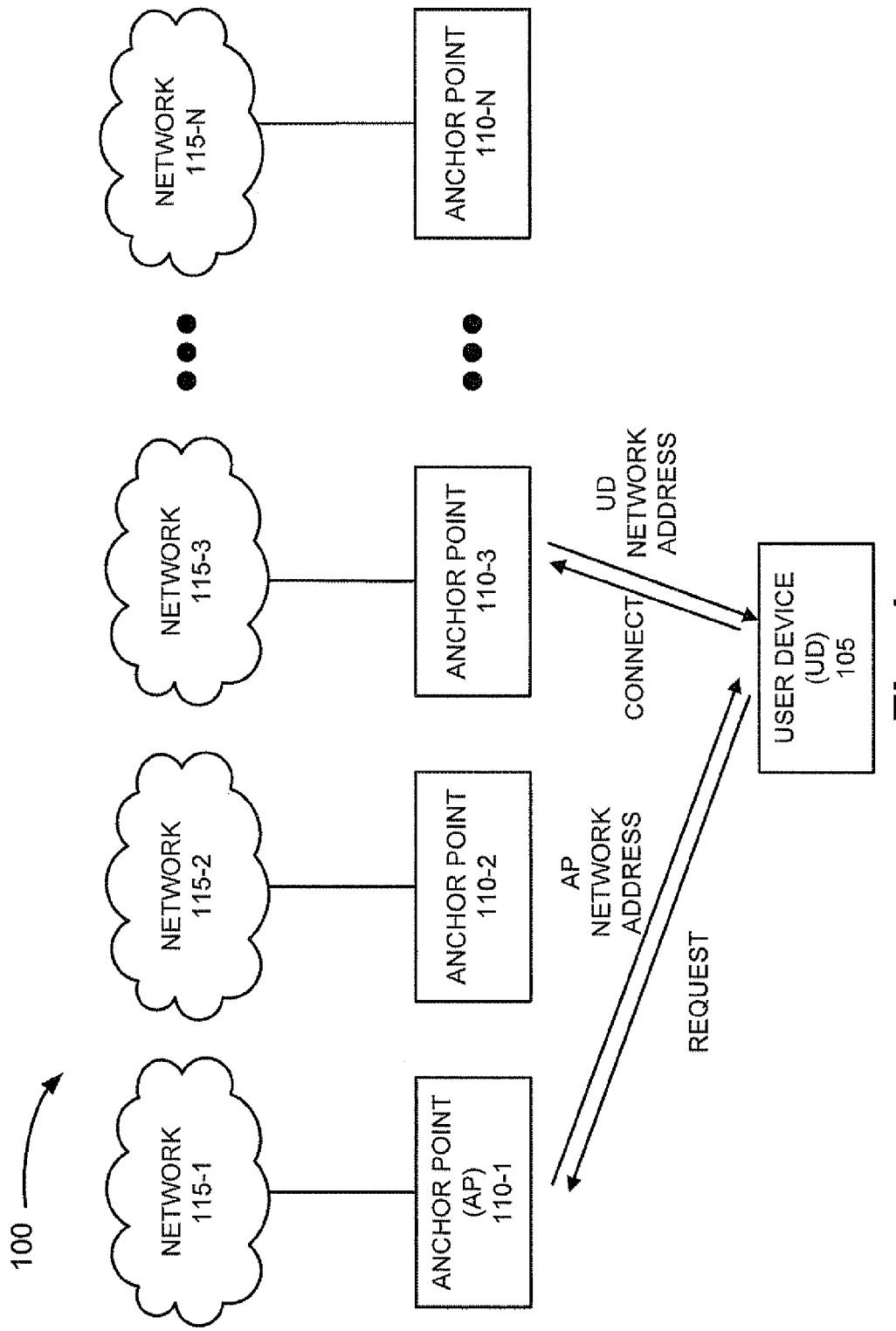
FIG. 1 is a diagram illustrating concepts described herein.

FIG. 1 is a diagram illustrating concepts described herein. As illustrated in FIG. 1, an exemplary environment 100 may include a user device 105, APs 110-1 to 110-N, and networks 115-1 to 115-N. In other implementations, environment 100 may include additional, fewer, or different devices and/or networks. Additionally, or alternatively, a different arrangement of devices and/or networks may be implemented. For example, one or more APs 110-1 to 110-N may connect to the same network 115. The connections in environment 100, as illustrated in FIG. 1, are exemplary.

User device 105 may include a device with communication capability. For example, user device 105 may include a portable device, a handheld device, a wireless telephone, a mobile station, a user equipment (UE), a computer, a personal digital assistant (PDA), a web browsing device, an Internet-based device, a personal communication systems (PCS) terminal, a kiosk terminal, a pervasive computing device, a gaming device, a music-playing device, a video-playing device, a vehicle-based user device, and/or some other type of user device.

APs 110-1 to 110-N may each include a network device. For example, APs 110-1 to 110-N may each include a gateway, a router, a home agent, or some other type of network device that provides access to networks 115-1 to 115-N, respectively.

Networks 115-1 to 115-N may include any type of network. For example, networks 115-1 to 115-N may each include a local area network (LAN), a wide area network (WAN), a telephone network, such as a Public Switched Telephone Network (PSTN) or a Public Land Mobile Network (PLMN), a satellite network, an intranet, the Internet, a data network, or a combination of networks or communication systems. Networks 115-1 to 115-N may each provide, for example, an application, a service, a resource, etc., that user device 105 may access and/or utilize.

In an exemplary operation, user device 105 may access one of APs 110-1 to 110-N. For example, assume that AP 110-1 corresponds to a default AP (e.g., a home agent). When user device 105 chooses to use or access an application, a service, a resource, etc., user device 105 may issue a request to AP 110-1. AP 110-1 may determine that it does not provide access to the application, service, resource, etc., requested or AP 110-1 may forward the request to another network device, which may make such a determination. For purposes of discussion, assume that AP 110-3 provides the application or service that is requested. In response to the request, AP 110-1 (or another network device via AP 110-1) may provide user device 105 with the network address or access point name (APN) of AP 110-3. User device 105 may access the desired application, service, resource, etc., via AP 110-3 based on the network address or APN received from AP 110-1. AP 110-3 may provide user device 105 with another network address that is anchored by AP 110-3. User device 105 may utilize or access the desired application, service, resource, etc., via AP 110-3.

As a result of the foregoing, a user's experience may be significantly enhanced by providing multiple APs, where each AP may provide access to respective applications, services, resources, etc. Additionally, from a network operator's perspective, each AP may support respective applications, services, resources, etc., and provide tailored access, rules, controls, billing, etc., corresponding to the respective applications, services, resources, etc., provided. Since concepts have been broadly described, variations to the above concepts will be discussed further below.

Figure 2:
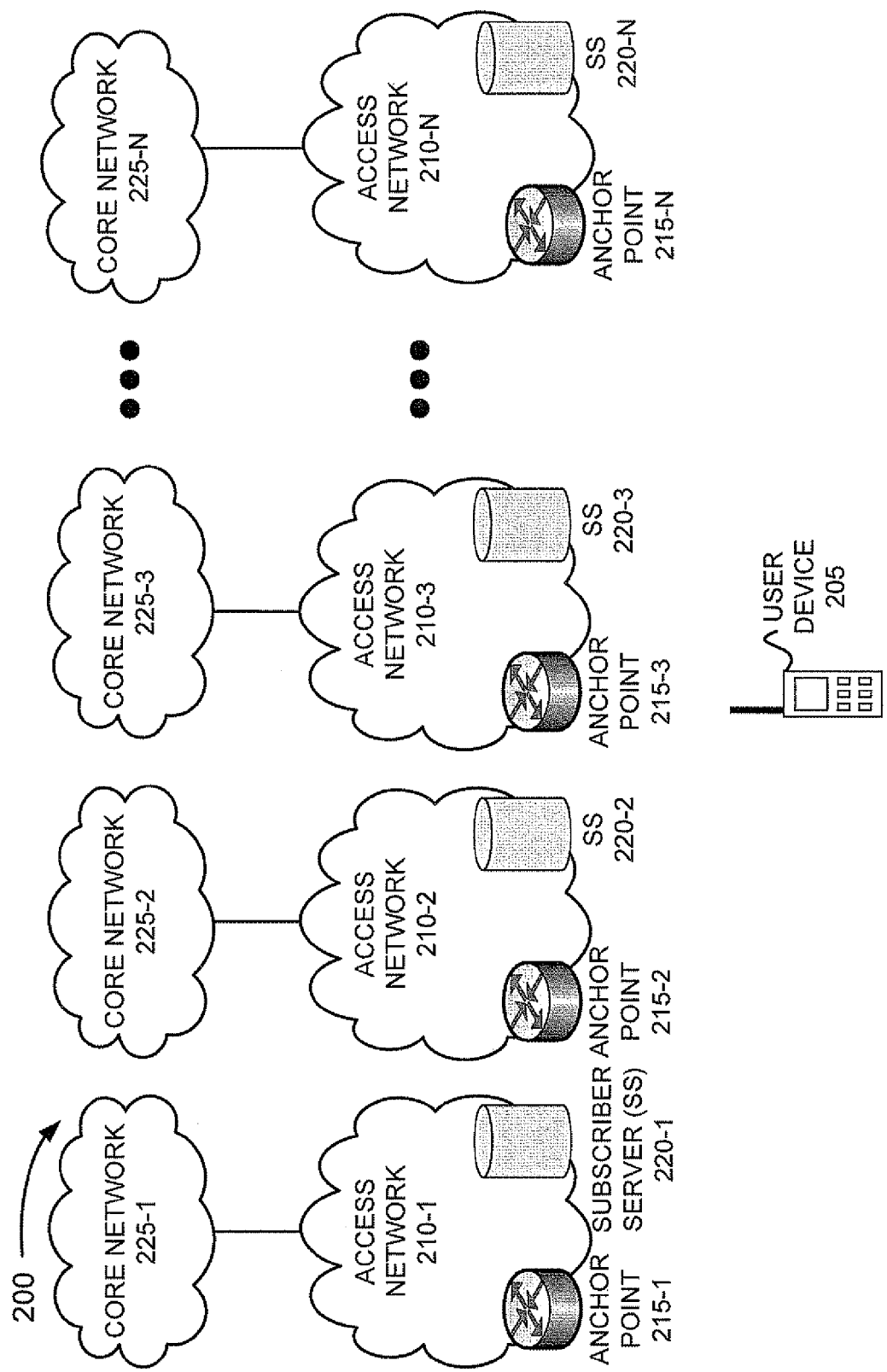
FIG. 2 is a diagram of an exemplary network in which systems and/or methods described herein may be implemented.

FIG. 2 is a diagram of an exemplary network in which the concepts described herein may be implemented. As illustrated, network 200 may include a user device 205, access networks 210-1 through 210-N, APs 215-1 through 215-N, subscriber servers (SSs) 220-1 through 220-N, and core networks 225-1 through 225-N. In other implementations, network 200 may include additional, fewer, or different devices and/or networks. Additionally, or alternatively, a different arrangement of devices and/or networks may be implemented. The connections in network 200, as illustrated in FIG. 2, are exemplary.

User device 205 and APs 215-1 through 215-N may correspond to devices, as previously described with regard to FIG. 1.

Access networks 210-1 through 210-N may each include any type of network. For example, access networks 210-1 through 210-N may include a LAN, a WAN, a telephone network, such as a PSTN or a PLMN, a satellite network, an intranet, the Internet, a data network, or a combination of networks.

SSs 220-1 through 220-N may each include a device that may provide connection control, such as, for example, connection establishment, connection termination, session enablement, authorization, authentication, etc. For example, one or more of SS 220s may correspond to a home subscriber server (HSS). In one implementation, as described below, one or more of SS 220s may provide user device 205 with a network address corresponding to an AP 215 that provides access to an application, a service, a resource, etc., in which user device 205 desires.

Core networks 225-1 through 225-N may correspond to networks 115-1 through 115-N in FIG. 1. For example, each of core networks 225-1 through 225-N may include any type of network, such as, for example, a wireless network, a wired network, the Internet, or a combination of networks. Core networks 225-1 through 225-N may provide access to an application, a service, a resource, etc., that user device 205 desires. For example, core networks 225-1 through 225-N may include servers and/or other types of network devices (not illustrated) that include an application, a service, a resource, etc.

Although FIG. 2 illustrates an exemplary network 200, in other implementations, network 200 may include additional, fewer, or different devices and/or networks. For example, one or more of access networks 210-1 through 210-N may not include a SS 220. Additionally, or alternatively, a different arrangement of devices and/or networks may be implemented. For example, an access network 210 may include multiple APs 215. It will also be appreciated that depending on the topology of network 200 and/or the business relationships existing between one or more network operators, one or more of the devices and/or networks in networks 200 may correspond to a home environment, a foreign environment, a roaming partner's environment, etc.

The connections in network 200, as illustrated in FIG. 2, are exemplary. Additionally, or alternatively, it will be appreciated that one or more functions described as being performed by a particular device of network 200 may be performed by another device(s) or network(s), or in combination therewith. For example, one or more functions, to be described below, with respect to SS 220, may be performed by other device(s) and/or network(s), in combination with, or instead of SS 220.

Figure 3A:
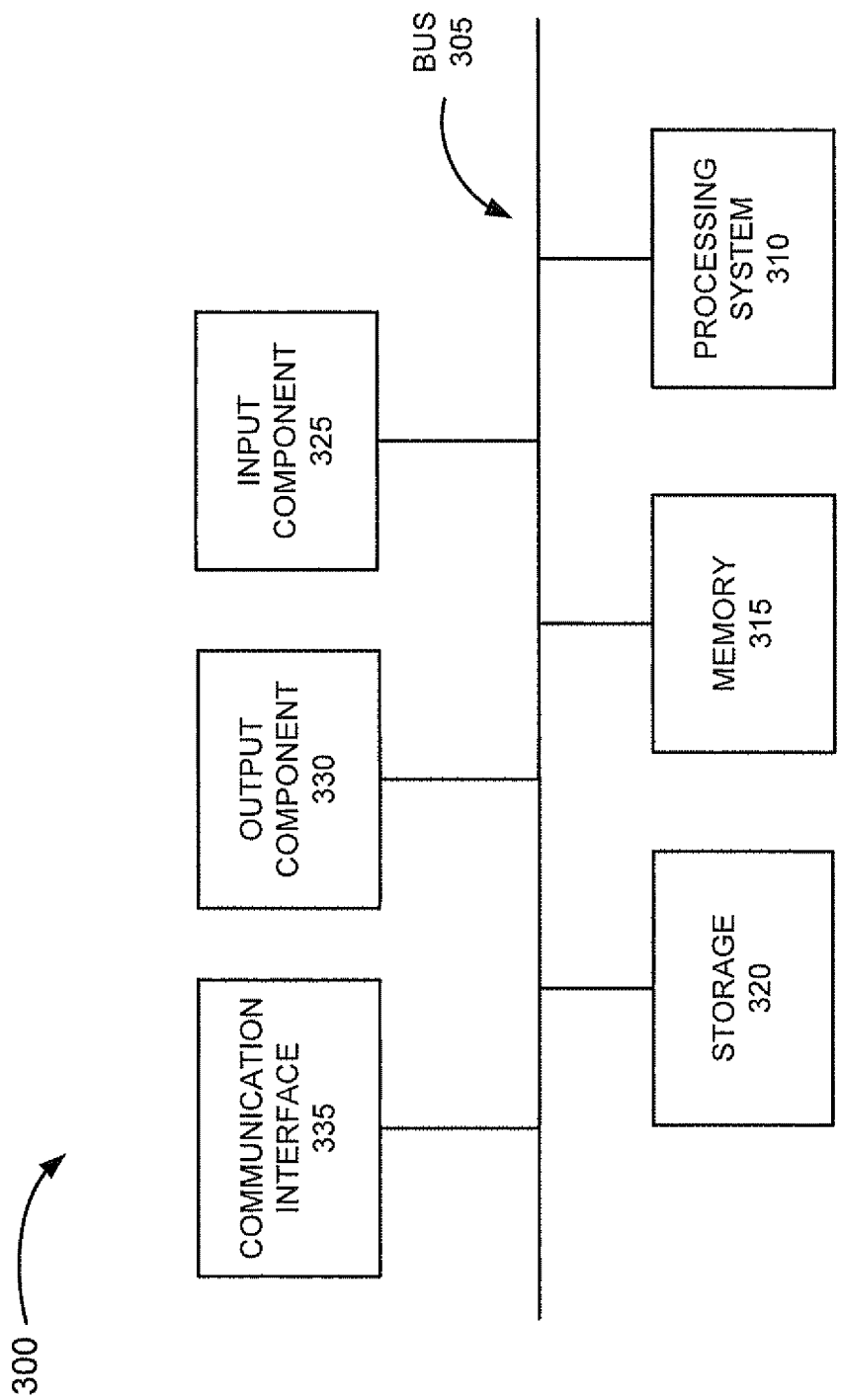
FIG. 3A is a diagram illustrating exemplary components of a device that may correspond to one or more of the exemplary devices depicted in FIGS. 1 and 2.

FIG. 3A is a diagram illustrating exemplary components of a device 300 that may correspond to one or more of the exemplary devices in network 200. For example, device 300 may correspond to user device 205, AP 215, and/or SS 220 of FIG. 2. As illustrated, device 300 may include a bus 305, a processing system 310, a memory 315, storage 320, an input component 325, an output component 330, and/or a communication interface 335.

Bus 305 may include a path that permits communication among the components of device 300. For example, bus 305 may include a system bus, an address bus, a data bus, and/or a control bus. Bus 305 may also include bus drivers, bus arbiters, bus interfaces, and/or clocks.

Processing system 310 may interpret and/or executes instructions and/or data. For example, processing system 310 may include a general-purpose processor, a microprocessor, a data processor, a co-processor, a network processor, an application specific integrated circuit (ASIC), a controller, a programmable logic device, a chipset, a field programmable gate array (FPGA), or some other component that may interpret and/or execute instructions and/or data.

Memory 315 may store data, an application, and/or instructions related to the operation of device 300. For example, memory 315 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage 320 may store data, an application(s) and/or instructions related to the operation of device 300. For example, storage 320 may include a hard disk (e.g., a magnetic disk, an optical disk, a magneto-optic disk, etc.) or another type of computer-readable medium, along with a corresponding drive. The term "computer-readable medium" is intended to be broadly interpreted to include a physical storing device (e.g., memory 315, storage 320, or some other type of volatile, non-volatile storage component) or a logical memory device. A logical memory device may refer to, for example, a memory space within a single physical memory device or spread across multiple physical memory devices. Memory 315 and/or storage 320 may also include a storing device external to and/or removable from device 300, such as a Universal Serial Bus (USB) memory stick, a hard disk, etc.

Input component 325 may permit a user and/or another component to input information in device 300. For example, input component 325 may include a keyboard, a keypad, a touch screen, a touchpad, a mouse, a button, a switch, a microphone, an input port, voice recognition logic, and/or some other type of visual, auditory, etc., input component. Output component 330 may permit device 300 to output information to a user and/or another component. For example, output component 330 may include a display, a speaker, one or more light emitting diodes (LEDs), an output port, a vibrator, and/or some other type of visual, auditory, tactile, etc., output component.

Communication interface 335 may enable device 300 to communicate with other components, devices, and/or networks. For example, communication interface 335 may include an Ethernet interface, an optical interface, a coaxial interface, a radio interface, or the like that permits device 300 to communicate with devices and/or networks in network 200.

Although FIG. 3A illustrates exemplary components, in other implementations, device 300 may include additional, fewer, or different components, or differently arranged components.

Figure 3B:
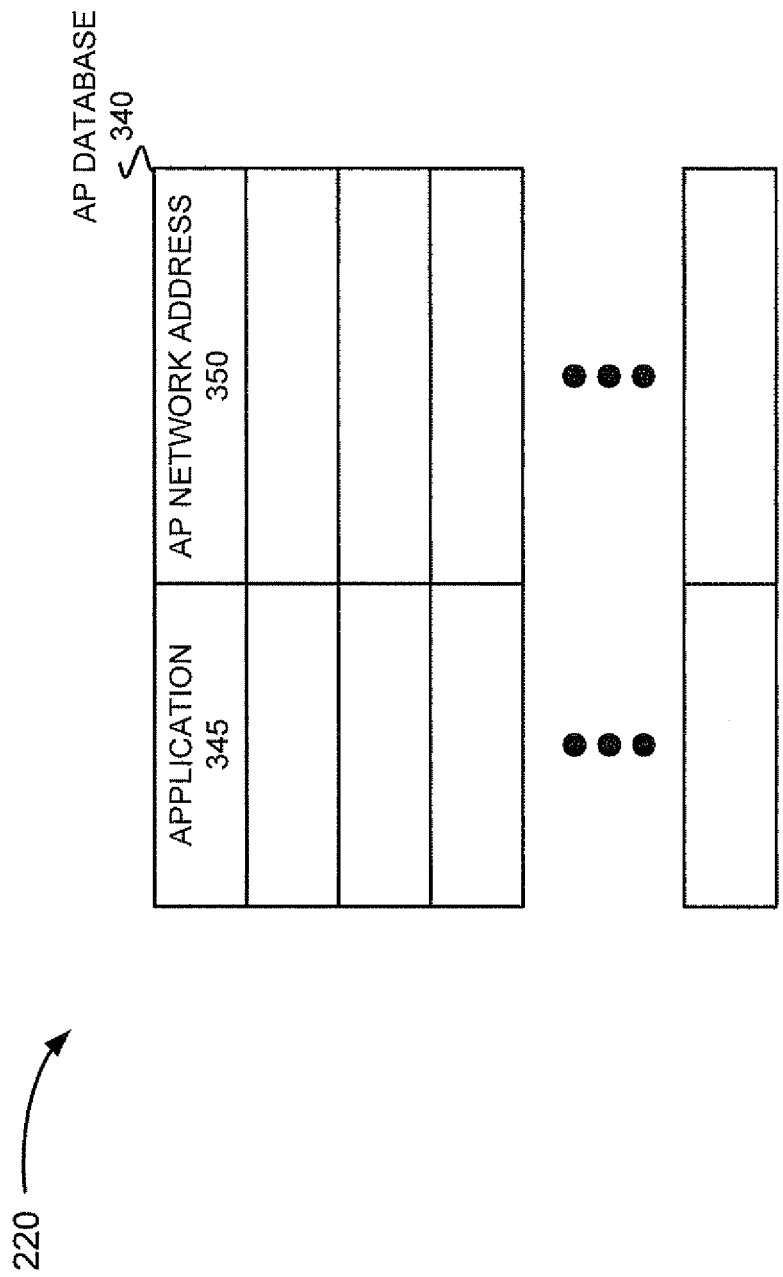
FIG. 3B is a diagram of an exemplary access point database.

As previously described in relation to FIG. 1, when a user device wishes to access an application, a service, a resource, etc., an appropriate AP may be selected. In an exemplary implementation, the selection of the appropriate AP may be based on referencing a database. FIG. 3B is a diagram of an exemplary AP database 340. For purposes of discussion, AP database 340 may reside in one or more of SS 220s. As illustrated, AP database 345 may include an application field 345 and an AP network address field 350.

Application field 345 may include an identifier (e.g., a character string) corresponding to an application (e.g., Voice over Internet Protocol (VOIP)), a service (Virtual Private Network (VPN)), or a resource (e.g., data), etc., an identifier corresponding to a segmentation (e.g., a category) of an application, a service, or a resource, (e.g., billed applications, billed services, billed resources, unbilled applications, unbilled services, unbilled resources, special services (e.g., VPN, static IP assignment, special IP pool assignment), an identifier corresponding to applications requiring separation of signaling and content (e.g., Session Initiation Protocol (SIP), VoIP, SIP-based applications, SIP-based peer-to-peer (P2P), media streaming) etc., and/or identifiers corresponding to other forms of segmentations (e.g., classes) that may relate to the application, the service, the resource, etc., provided.

AP network address field 350 may include a network address of an AP that provides access to the corresponding application, service, resource, etc., in application field 345. AP network address field 350 may include an access point name (APN). The term "APN," as used herein, is intended to be broadly interpreted to include, for example, a network address, and/or other information associated with the access and/or utilization of a network, an application, a service, a resource, etc.

Although FIG. 3B illustrates an exemplary AP database 340, in other implementations, AP database 340 may include fewer, additional, or different fields than those illustrated and described with respect to FIG. 3B. Additionally, or alternatively, AP database 340, or portions thereof, may reside in one or more devices, other than, or in addition to SS 220. Further, in such instances, the one or more devices may perform certain functions that will have been described as being performed by SS 220.

Described below is an exemplary process for providing multiple APs to support multiple applications, services, resources, etc., that a user device may access or utilize. The process will be described as being performed by devices in network 200.

Figure 4:
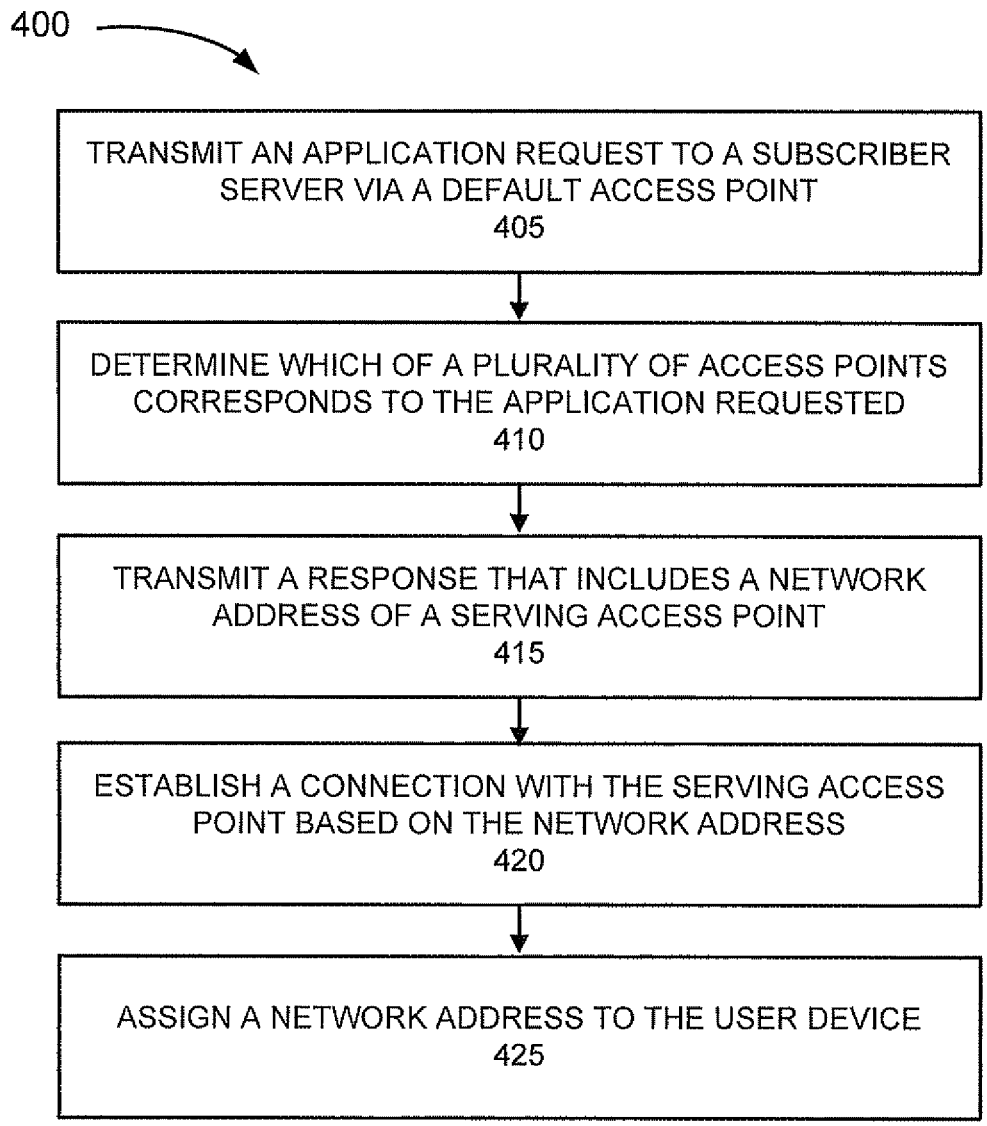
FIG. 4 is a flow diagram illustrating an exemplary process for providing multiple access points (APs) to support multiple applications, services, resources, etc., that a user device may access or utilize.

FIG. 4 is a flow diagram illustrating an exemplary process 400 for providing multiple APs to support multiple applications, services, resources, etc., that a user device may access or utilize. In addition to FIG. 4, process 400 may be described in reference to other figures. Process 400 will be described from an initial state where the user device has established communication with a default access point. The user device may be assigned a network address that is anchored by the default access point.

Figure 5:
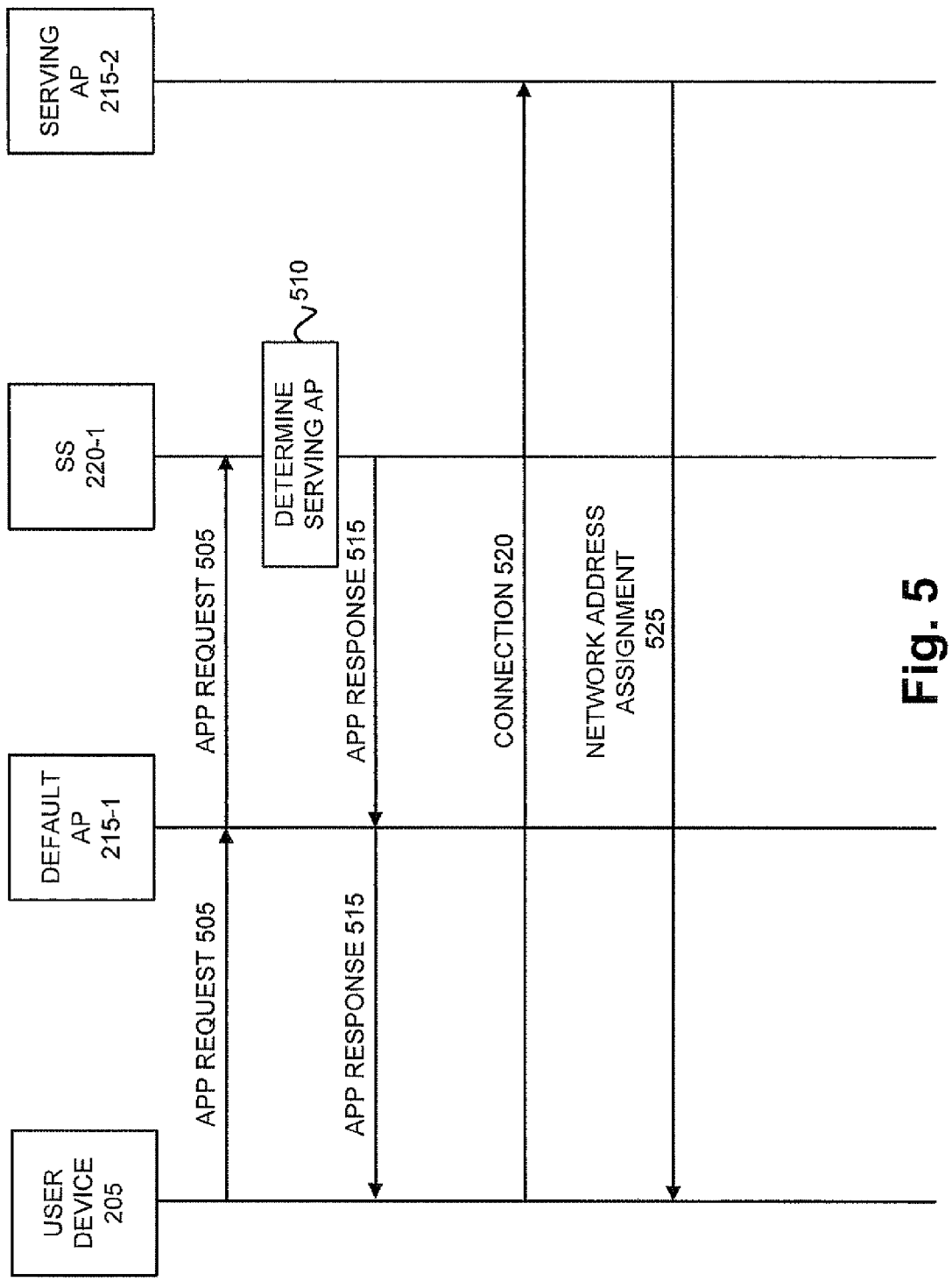
FIG. 5 is a diagram illustrating exemplary messages associated with the process of FIG. 4.

Process 400 may begin with transmitting an application request to a subscriber server via a default access point (block 405). For example, as illustrated in FIG. 5, user device 205 may transmit an application request 505 to SS 220-1 via default AP 215-1. Application request 505 may include information that identifies, for example, an application, a service, and/or a resource.

It may be determined which of a plurality of access points corresponds to the application requested (block 410). SS 220-1 may determine which of a plurality of access points (e.g., APs 215-1 through 215-N) provides the application, the service, the resource, etc., requested. In one implementation, SS 220-1 may access AP database 340 and utilize the information contained in application request 505. For example, application request 505 may contain information that corresponds to information contained in application field 345 of AP database 340. SS 220-1 may determine a serving AP 510 based on AP network address field 350. For example, SS 220-1 may determine a network address of an access point that provides the requested application based on AP network address field 350.

A response that includes a network address of a serving access point may be transmitted (block 415). For example, as illustrated in FIG. 5, SS 220-1 may transmit an application response 515 to user device 205 via default AP 215-1. Application response 515 may include information that identifies a serving AP that provides the application, the service, the resource, etc., requested. In one implementation, application response 515 may include an APN.

A connection with the determined access point based on the network address may be established (block 420). For example, as illustrated in FIG. 5, user device 205 may establish a connection 520 with the serving AP (e.g., AP 215-2) based on the network address or the APN included in application response 515.

A network address may be assigned to the user device (block 425). For example, as illustrated in FIG. 5, serving AP 215-2 may transmit a network address assignment 525 to user device 205. User device 205 may use this network address during the access or utilization of the application, the service, the resource, etc. The network address may be anchored by serving AP 215-2.

Although FIG. 4 illustrates an exemplary process 400, in other implementations, fewer, additional, or different operations may be performed.

According to the concepts described herein, a user device may be anchored to one or multiple APs to support multiple applications, services, resources, etc., that the user device desires to access or utilize. Each of the APs may support different requirements corresponding to the respective application, service, resource, etc., that it supports. For example, some applications may be better (e.g., in terms of quality of service (QoS), billing, etc.) anchored at a home access point (e.g., Multimedia Messaging Service (MMS), Short Messaging Service (SMS), ringtone downloads, etc.), while other applications may be better anchored at a roaming partner's access point, such as, for example, VoIP.

Figure 6:
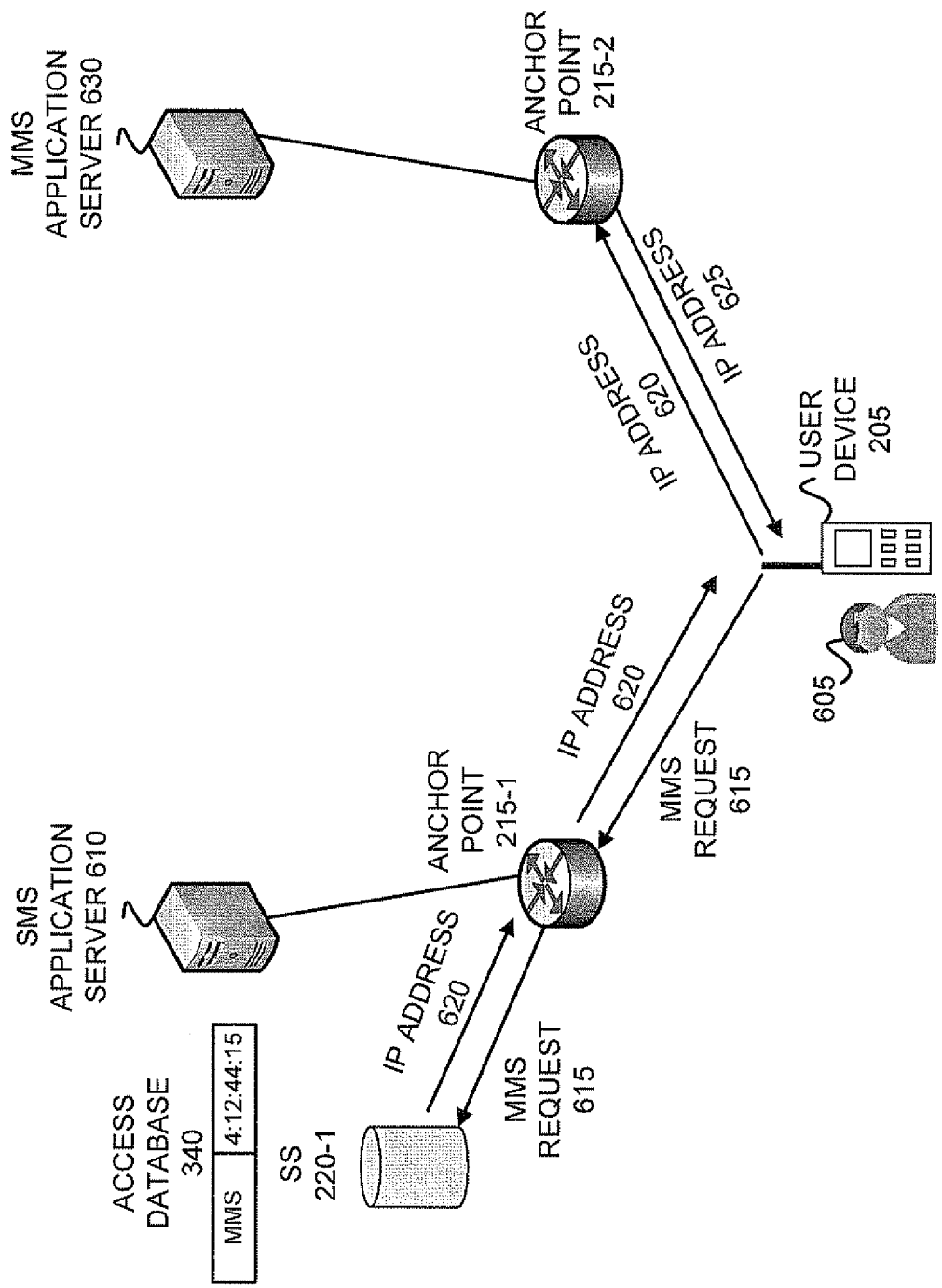
FIGS. 6 and 7 are diagrams illustrating examples of the concepts described herein.

FIG. 6 is a diagram illustrating an example of the concepts described herein. As illustrated, a user 605, via user device 205, may start an MMS application. User device 205 may transmit application request 505 (e.g., a MMS request 615) to anchor point 215-1. MMS request 615 may identify MMS as the application. Anchor point 215-1 may forward MMS request 615 (or generate a new request) to SS 220-1. SS 220-1 may reference access database 340 based on MMS request 615. For example, the information in MMS request 615 may correspond to application field 345 of access database 340. SS 220-1 may determine a network address (e.g., an IP address (4:12:44:15)) that corresponds to anchor point 215-2, which provides access to MMS services. SS 220-1 may transmit IP address 620 to user device 205 via anchor point 215-1. Based on IP address 620, user device 205 may connect to anchor point 215-2. User device 205 may receive from anchor point 215-2 a network address (e.g., IP address 625) that is anchored by anchor point 215-2. User 605 may access a MMS application server 630 via anchor point 215-2 to utilize MMS services.

Additionally, some applications may be better anchored at a dedicated home access point, such as, for example, VPN or a governmental requested special service, while other applications (e.g., VoIP, SIP, or other emerging applications) may be better anchored by two or more different access points. For example, one access point may be assigned to carry signaling traffic while another access point may carry bearer traffic. In one implementation, an access point of a home carrier network may support the signaling traffic while another access point of a visited network may support the bearer traffic. In this framework, where different access points are used to support bearer and signaling traffic, the following may be supported: local breakout for bearer traffic using a roaming partner's access point and bearer APN, bring bearer traffic back using a home access point and bearer APN, and only use control charging records for billing (e.g., ignore bearer charging records).

Figure 7:
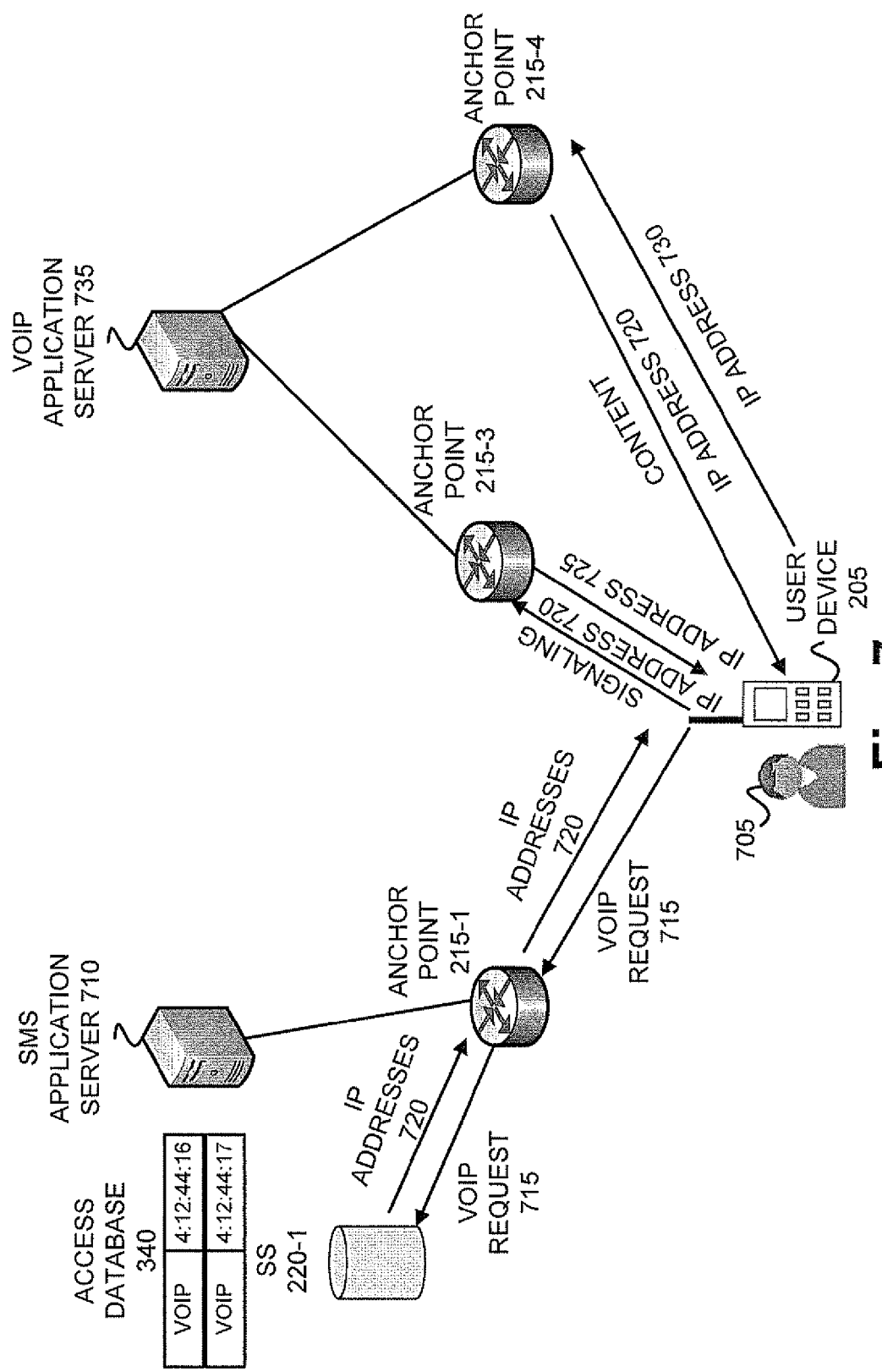

FIG. 7 is a diagram illustrating another example of the concepts described herein. As illustrated, a user 705, via user device 205, may start a VoIP application. User device 205 may transmit application request 505 (e.g., a VoIP request 715) to anchor point 215-1. VoIP request 715 may identify VoIP as the application. Anchor point 215-1 may forward VoIP request 715 (or generate a new request) to SS 220-1. SS 220-1 may reference access database 340 based on VoIP request 715. SS 220-1 may determine two network addresses (e.g., IP addresses (4:12:44:16 and 4:12:44:17)) that correspond to anchor points 215-3 and 215-4, respectively. For example, anchor point 215-3 may be used for signaling related to VoIP services, while anchor point 215-4 may be used for content. SS 220-1 may transmit IP addresses 720 to user device 205 via anchor point 215-1. Based on IP addresses 720, user device 205 may connect to anchor points 215-3 and 215-4. User device 205 may receive from anchor points 215-3 and 215-4 network addresses (e.g., IP address 725 and IP address 730) that are anchored by anchor points 215-3 and 215-4. User 705 may access a VoIP application server 735 via anchor points 215-3 and 215-4 to utilize VoIP services.

Additionally, in cases where a dedicated access point is used, the access point may be enhanced to include additional capabilities, such as, for example, deep packet inspections. In such cases, this may permit access charging records to be separated from charging records of other application traffic to avoid costly billing mediation. In other cases, a common APN may support both carrier home and roaming operations using different domain name system (DNS) resolutions for desired applications. For example, for some carrier partners, a user device may use the roaming partner's access point to anchor an application using the roaming partner's DNS configured to point to a local or default access point. In other instances, for some carrier partners, a user device may use a roaming partner's DNS to point a roaming partner's access point back to a home access point to anchor an application.

It will be appreciated that other network topologies may be implemented according to the concepts described herein. For example, a network operator may utilize dedicated anchor points for home-based applications (e.g., MMS, ringtones, VCAST applications, Java-based application) and other anchor points for IP-based traffic. In such an implementation, billing and charging record generation may be different between home-based applications and Internet-based traffic. For example, billing and/or charging information associated with Internet access may be based on the amount of bits or bytes used to serve a user. In contrast, billing and/or charging information associated with home-based applications may be based on the service provided. In this way, the generation of billing records may be minimized because differentiation between application server traffic versus Internet traffic is readily managed. Additionally, anchor points may offer improved controls (e.g., policies, enforcement, etc.) associated with the access and/or use of an application, service, or resource.

Additionally, as described herein, a user device may support multiple APNs corresponding to multiple applications, services, resources, etc.

The foregoing description of implementations provides illustration, but is not intended to be exhaustive or to limit the implementations to the precise form disclosed. Accordingly, modifications to the concepts, implementations, etc., described herein may be possible.

The term "may" is used throughout this application and is intended to be interpreted, for example, as "having the potential to," "configured to," or "being able to", and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while a series of blocks has been described with regard to the process illustrated in FIG. 4, the order of the blocks may be modified in other implementations. Further, non-dependent blocks may be performed in parallel.

It will be apparent that the device(s) described herein may be implemented in many different forms of software or firmware in combination with hardware in the implementations illustrated in the figures. The actual software code (executable by hardware) or specialized control hardware used to implement the concepts described herein does not limit the disclosure of the invention. Thus, the operation and behavior of a device(s) was described without reference to the specific software code—it being understood that software and control hardware can be designed to implement the concepts based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method comprising:
   establishing, based on a first network address assigned to a user device configured to concurrently support multiple anchor points, a connection with a home anchor point that anchors the first network address, wherein the multiple anchor points support different requirements associated with applications, services, and resources;
   transmitting, from the user device to the home anchor point, a request identifying an application, a service, or a resource of the applications, services, and resources;
   receiving, by the user device via the home anchor point, a response to the request, which includes information that identifies an anchor point that supports one or more of the different requirements associated with the identified application, the identified service, or the identified resource;

establishing, by the user device, a connection with the identified anchor point based on the information in the response;

receiving, by the user device from the identified anchor point, an assignment of a second network address that is anchored by the identified anchor point; and accessing, by the user device, a server device with respect to the one or more of the different requirements associated with the identified application, the identified service, or the identified resource, via the identified anchor point using the second network address, and via the home anchor point with respect to one or more others of the different requirements associated with the identified application, the identified service, or the identified resource.

2. The method of claim 1, where the response includes an access point name (APN).

3. A method performed by one or more devices, comprising:

receiving, at a home agent of the one or more devices, a request from a user device identifying an application, a service, or a resource;

determining that the home agent is not configured to support one or more requirements corresponding to the application, the service, or the resource requested;

identifying a set of access points, of a plurality of access points, supporting different ones of the one or more requirements corresponding to the application, the service, or the resource requested; and transmitting, to the user device, a response including information identifying a location of each of the identified access points, wherein the home agent corresponds to one of the plurality of access points;

establishing, via the identified location for each of the identified access points, a connection between the user device and a server device with respect to the one or more requirements of the application, service, or resource requested; and establishing, via the home agent, another connection between the user device and the server device with respect to at least one requirement of the application, the service, or the resource requested.

4. The method of claim 3, wherein the location of each of the identified access points provides access to a different one of the requirements of the application, the service, or the resource requested.

5. The method of claim 3, wherein identifying the set of access points comprises:

accessing a database based on the request; and retrieving the location, that includes an APN (access point name) of each of the identified access points, for providing different ones of the requirements of the application, the service, or the resource requested.

6. The method of claim 3, wherein the home agent comprises:

a home agent in a mobile Internet protocol (IP) network.

7. The method of claim 3, further comprising:

assigning a respective network address, which differs from a network address of the home agent, to the user device to connect to the server device via each of the identified access points, for utilizing or accessing the application, the service, or the resource requested.

8. A user device comprising:

a communication interface;

a memory to store a plurality of instructions; and one or more processors to execute the instructions to:

transmit, to a default access point via the communication interface, a request identifying an application, a service, or a resource, wherein the default access point supports at least one segment of the identified application, service, or resource;

receive, via the default access point, a response to the request, which includes information that identifies a location associated with each serving access point, of a set of serving access points, which support different segments of the identified application, the identified service, or the identified resource;

connect, via the identified locations, to each serving access point of the set of serving access points; and access a server device with respect to one or more of the different segments of the identified application, the identified service, or the identified resource via one or more of the serving access points, and via the default access point with respect to the at least one segment of the identified application, the identified service, or the identified resource.

9. The user device of claim 8, wherein the one or more processors executes the instructions further to:

receive a network address that is anchored by the default access point; and receive a different network address anchored by each of the serving access points.

10. The user device of claim 8, where the response includes an access point name (APN).

11. The user device of claim 8, where the user device includes a mobile device.

12. The user device of claim 8, wherein the one or more execute the instruction further to:

utilize the default access point for signaling associated with access or utilization of the at least one segment of the identified application, the identified service, or the identified resource; and utilize the one or more serving access points for bearer traffic associated with access or utilization of the one or more of the identified application, the identified service, or the identified resource.

13. A network device comprising:

a communication interface;

a memory to store a plurality of instructions; and one or more processors to execute the instructions to:

anchor a user device via a network address assigned to the user device;

receive, from the user device via the network address, a request identifying an application, a service, or a resource;

determine that one or more segments of the application, the service, or the resource requested are not supported by the network device;

identify a set of access points, of a plurality of access points, that support the different ones of the one or more segments of the application, service, or the resource requested;

transmit a response to the request that includes information identifying a location of each of the identified access points to the user device, for establishing a connection between the user device and a server device, wherein the location of each of the identified access points supports different ones of the one or more segments of the application, service, or resource requested; and establish, via the network device, another connection between the user device and the server device with respect to at least one segment of the application, service, or resource requested.

14. The network device of claim 13, wherein the network device includes a home subscriber server, and the identified access points support differentiated billing and charging record generation related to the different segments of the application, the service, or the resource requested.

15. The network device of claim 13, wherein the one or more processors execute the instructions further to:
    access a database that identifies the different segments of the application, the service, or the resource requested and the corresponding identified access points; and
    retrieve the locations and corresponding network addresses of the identified access points based on the received request.

16. The network device of claim 13, wherein the different segments include signaling traffic and content traffic, and wherein the network device includes a home agent of a mobile Internet protocol (IP) network.

17. A computer-readable memory containing instructions executable by at least one processor, the computer-readable memory storing one or more instructions for:
    connecting to a default access point;
    receiving a network address that is anchored by the default access point;
    transmitting to the default access point a request to identifying an application, a service, or a resource, wherein the default access point supports at least one requirement corresponding to the identified application, the identified service, or the identified resource;
    receiving, via the default access point, a response that identifies a network address of each serving access point of a set of serving access points that support different requirements corresponding to the identified application, the identified service, or the identified resource;
    connecting to each of the serving access points using the identified network addresses;
    receiving, from each of the serving access points, a network address anchored by the respective serving access point; and
    accessing a server device with respect to the different requirements via the network addresses anchored by the respective serving access points, and via the network address that is anchored by the default access point with respect to the at least one requirement.

18. The computer-readable memory of claim 17, where the response includes an access point name (APN).

19. The computer-readable memory of claim 17, where the computer-readable memory resides in a user device.

* * * * *